United States Patent
Tripathi et al.

(10) Patent No.: US 11,770,293 B2
(45) Date of Patent: Sep. 26, 2023

(54) TRANSMISSION OF NTN TYPE AND NTN TYPE BASED CONFIGURATION OF OPERATIONAL PARAMETERS

(71) Applicant: Samsung Electronics Co., Ltd., Suwon-si (KR)

(72) Inventors: Nishith D. Tripathi, Parker, TX (US); Hongbo Si, Plano, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 17/066,402

(22) Filed: Oct. 8, 2020

(65) Prior Publication Data

US 2021/0119861 A1    Apr. 22, 2021

Related U.S. Application Data

(60) Provisional application No. 62/923,671, filed on Oct. 21, 2019, provisional application No. 62/930,878,
(Continued)

(51) Int. Cl.
*H04L 41/0806* (2022.01)
*H04L 5/00* (2006.01)
*H04W 72/30* (2023.01)

(52) U.S. Cl.
CPC ........ *H04L 41/0806* (2013.01); *H04L 5/0048* (2013.01); *H04W 72/30* (2023.01)

(58) Field of Classification Search
CPC . H04L 41/0806; H04L 5/0048; H04L 1/1825; H04L 1/1835; H04L 27/2607;
(Continued)

(56) References Cited

U.S. PATENT DOCUMENTS

2018/0123672 A1\* 5/2018 Baker .................. H04B 7/0632
2019/0313357 A1\* 10/2019 Wang ................ H04W 56/0045
(Continued)

FOREIGN PATENT DOCUMENTS

WO     2019160737 A1    8/2019
WO     2019161044 A1    8/2019
(Continued)

OTHER PUBLICATIONS

Guidotti; "Architectures and Key Technical Challenges for 5G Systems Incorporating Satellites" arXiv: 1806.02088v1, Jun. 2018 (Year: 2018).\*
(Continued)

*Primary Examiner* — Ayaz R Sheikh
*Assistant Examiner* — Louis Samara

(57) ABSTRACT

An apparatus and method of a network entity in a wireless communication system is provided. The apparatus and method comprises: identifying a non-terrestrial network (NTN) type associated with an NTN; configuring a set of operational parameters for performing wireless communication based on the NTN type; identifying, based on a network configuration associated with the NTN, one or more interfaces to transmit information indicating the NTN type; and transmitting, to a user equipment (UE) or a network function (NF), the information indicating the NTN type via the identified one or more interfaces.

19 Claims, 10 Drawing Sheets

Related U.S. Application Data filed on Nov. 5, 2019, provisional application No. 62/994,559, filed on Mar. 25, 2020, provisional application No. 63/056,276, filed on Jul. 24, 2020.

(58) Field of Classification Search
CPC .. H04L 1/1685; H04L 1/1822; H04W 72/005; H04W 48/10; H04W 56/0045; H04W 76/28; H04B 7/18513; H04B 7/155; H04B 7/0632; H04B 7/18504; H04B 7/18519

See application file for complete search history.

(56) References Cited

U.S. PATENT DOCUMENTS

| | | | | |
|---|---|---|---|---|
| 2020/0413451 | A1* | 12/2020 | Taherzadeh Boroujeni | H04B 7/18504 |
| 2021/0029658 | A1* | 1/2021 | Mahalingam | H04B 7/18513 |
| 2021/0029679 | A1* | 1/2021 | Si | H04L 1/1685 |
| 2021/0036769 | A1* | 2/2021 | Sorond | H04B 7/155 |
| 2021/0068169 | A1* | 3/2021 | Wang | H04L 27/2607 |
| 2021/0075501 | A1* | 3/2021 | Xu | H04B 7/18519 |
| 2022/0007455 | A1* | 1/2022 | Hong | H04W 76/28 |
| 2022/0045803 | A1* | 2/2022 | Lin | H04L 1/1822 |

FOREIGN PATENT DOCUMENTS

| | | | | | |
|---|---|---|---|---|---|
| WO | WO-2019160737 | A1 | * | 8/2019 | ........... H04L 1/1835 |
| WO | 2019195457 | A1 | | 10/2019 | |
| WO | WO-2019195457 | A1 | * | 10/2019 | ......... H04B 7/18504 |
| WO | WO-2021072722 | A1 | * | 4/2021 | |

OTHER PUBLICATIONS

M. Julius; "Feasibility Study on Disaster Management with Hybrid Network of LTE and Satellite links"; arXiv: 1609.02375 (Year: 2016).*

Manilo Bacco, "Networking Challenges for Non-Terrestrial Networks Exploitation in 5G", 2019 IEEE 2nd 5G World Forum (5GWF) pp. 623-628 (Year: 2019).*

5G-PPP-5G-Architecture-White-Paper_v3.0_PublicConsultation, p. 76, Jul. 5, 2019 (Year: 2019).*

"Architectures and Key Technical Challenges for 5G Systems Incorporating Sattellites", Alessandro Guidotti, IEEE on Vehicular Technology, vol. 68, No. 3, Mar. 2019 (Year: 2019).*

"Next Generation on Board Payload Architectures" Ana Yun, 2008 4th Advance Satellite Mobile System 2008, conference Aug. 26-28, 2008 (Year: 2008).*

3GPP TS 22.261 V17.3.0 (Jul. 2020), Technical Specification, "3rd Generation Partnership Project; Technical Specification Group Services and System Aspects; Service requirements for the 5G system; Stage 1 (Release 17)", Jul. 2020, 83 pages.

3GPP TR 38.811 V15.3.0 (Jul. 2020), Technical Report, "3rd Generation Partnership Project; Technical Specification Group Radio Access Network; Study on New Radio (NR) to support non-terrestrial networks (Release 15)", Jul. 2020, 126 pages.

3GPP TR 22.822 V16.0.0 (Jun. 2018), Technical Report, "3rd Generation Partnership Project; Technical Specification Group Services and System Aspects; Study on using Satellite Access in 5G; Stage 1 (Release 16)", Jun. 2018, 35 pages.

International Search Report and Written Opinion of the International Searching Authority dated Jan. 22, 2021 in connection with International Application No. PCT/KR2020/014251, 9 pages.

International Telecommunication Union, ITU-R Radiocommunication Sector of ITU, Recommendation ITU-R M.1224-1, Vocabulary of terms for International Mobile Telecommunications (IMT), M Series, Mobile, radiodetermination, amateur and related satellite services, Mar. 2012, 125 pages.

Huawei, et al., "Discussion on random access procedure for NTN," R1-1813661, 3GPP TSG RAN WG1 Meeting #95, Spokane, USA, Nov. 12-16, 2018, 2 pages.

Huawei, et al., "Overview of NTN," R1-1903195, 3GPP TSG RAN WG1 Meeting #96, Athens, Greece, Feb. 25-Mar. 1, 2019, 4 pages.

LG Electronics Inc., "Report on email discussion [107#64][NTN] Cell Selection & reselection," R2-1914070, 3GPP TSG-RAN WG2 Meeting #107bis, Chongqing, China, Oct. 14-18, 2019, 21 pages.

Extended European Search Report dated Oct. 12, 2022 regarding Application No. 20878535.2, 14 pages.

"3rd Generation Partnership Project; Technical Specification Group Services and System Aspects; Study on architecture aspects for using satellite access in 5G (Release 16)", 3GPP TR 23.737 V1.0.0, Aug. 2019, 46 pages.

* cited by examiner

TRANSMISSION OF NTN TYPE AND NTN TYPE BASED CONFIGURATION OF OPERATIONAL PARAMETERS

CROSS-REFERENCE TO RELATED APPLICATIONS AND CLAIM OF PRIORITY

The present application claims priority to:
U.S. Provisional Patent Application No. 62/923,671, filed on Oct. 21, 2019;
U.S. Provisional Patent Application No. 62/930,878, filed on Nov. 5, 2019;
U.S. Provisional Patent Application No. 62/994,559, filed on Mar. 25, 2020; and
U.S. Provisional Patent Application No. 63/056,276, filed on Jul. 24, 2020.
The content of the above-identified patent document is incorporated herein by reference.

TECHNICAL FIELD

The present disclosure relates generally to non-terrestrial networks and, more specifically, the present disclosure relates to non-terrestrial network (NTN) type and NTN type based configuration of operational parameters.

BACKGROUND

A $5^{th}$ generation (5G) user equipment (UE) or a $4^{th}$ generation (4G) UE may connect to a terrestrial network (TN), a non-terrestrial network (NTN), or both a TN and an NTN. There are different types of NTNs using different types of platforms. For example, one platform may be a geo stationary orbit satellite (GEO), a medium earth orbiting (MEO) satellite, a low earth orbiting (LEO) satellite, a high altitude platform station (HAPS). The platform may take the form of an air-to-ground (ATG) system.

SUMMARY

The present disclosure generally relates to generally to non terrestrial networks and, more specifically, the present disclosure relates to NTN type and NTN type based configuration of operational parameters.

In one embodiment, a network entity in a wireless communication system provides the NTN Type to the UE and other network entities. The network entity comprises a processor configured to: identify a NTN type associated with an NTN; configure a set of operational parameters for performing wireless communication based on the NTN type; and identify, based on a network configuration associated with the NTN, one or more interfaces to transmit information indicating the NTN type. The network entity further comprises a transceiver operably connected to the processor, the transceiver configured to transmit, to a user equipment (UE) or network function (NF), the information indicating the NTN type via the identified one or more interfaces.

In another embodiment, a UE in a wireless communication system is provided. The UE comprises a transceiver configured to receive, from a network entity, information indicating an NTN type and a processor operably connected to the transceiver, the processor configured to: determine a set of operational parameters configured based on the NTN type, and perform wireless communication according to the set of operational parameters.

In yet another embodiment, a method of a network entity in a wireless communication system is provided. The method comprises: identifying a NTN type associated with an NTN; configuring a set of operational parameters for performing wireless communication based on the NTN type; identifying, based on a network configuration associated with the NTN, one or more interfaces to transmit information indicating the NTN type; and transmitting, to a user equipment (UE) or a network function (NF), the information indicating the NTN type via the identified one or more interfaces.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
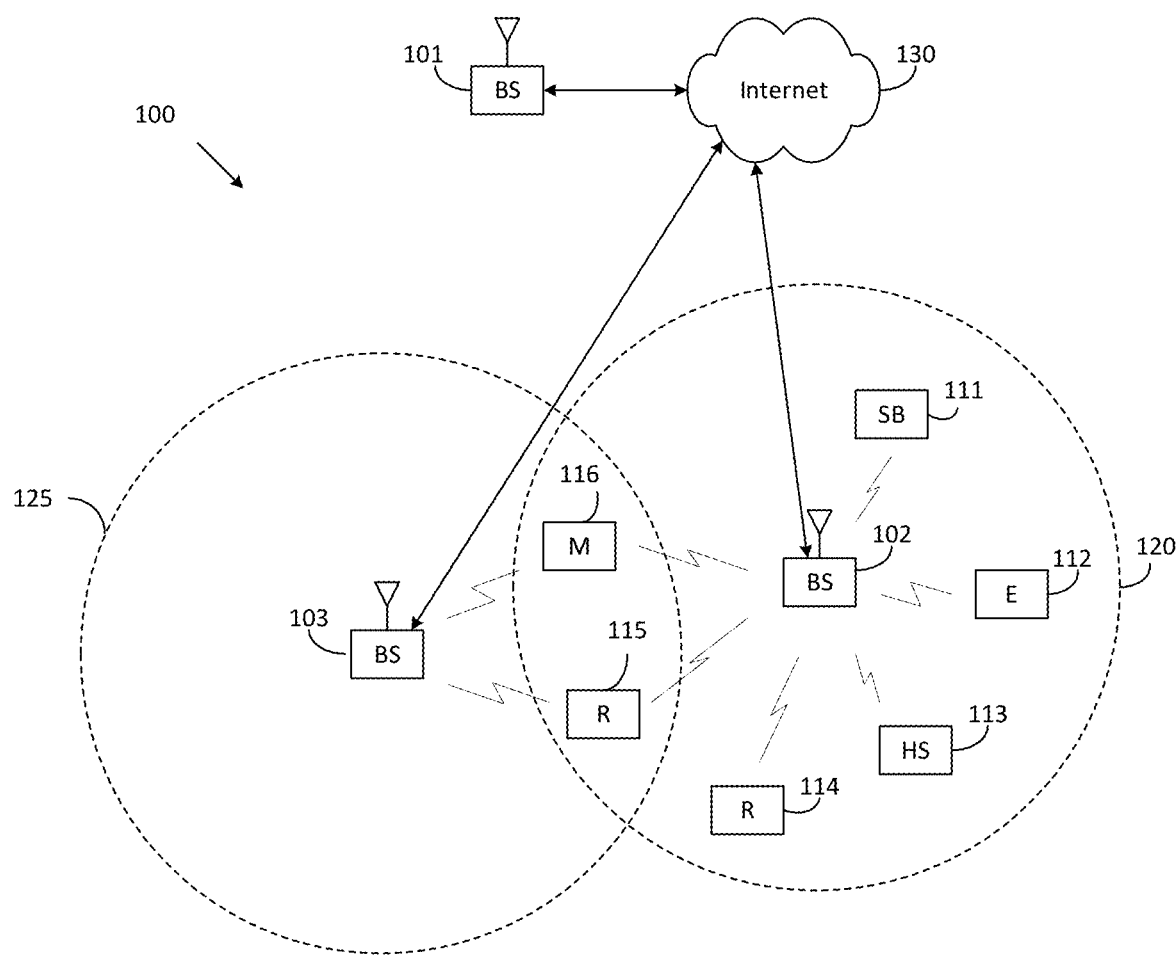
FIG. 1 illustrates an example wireless network according to embodiments of the present disclosure.
Figure 2:
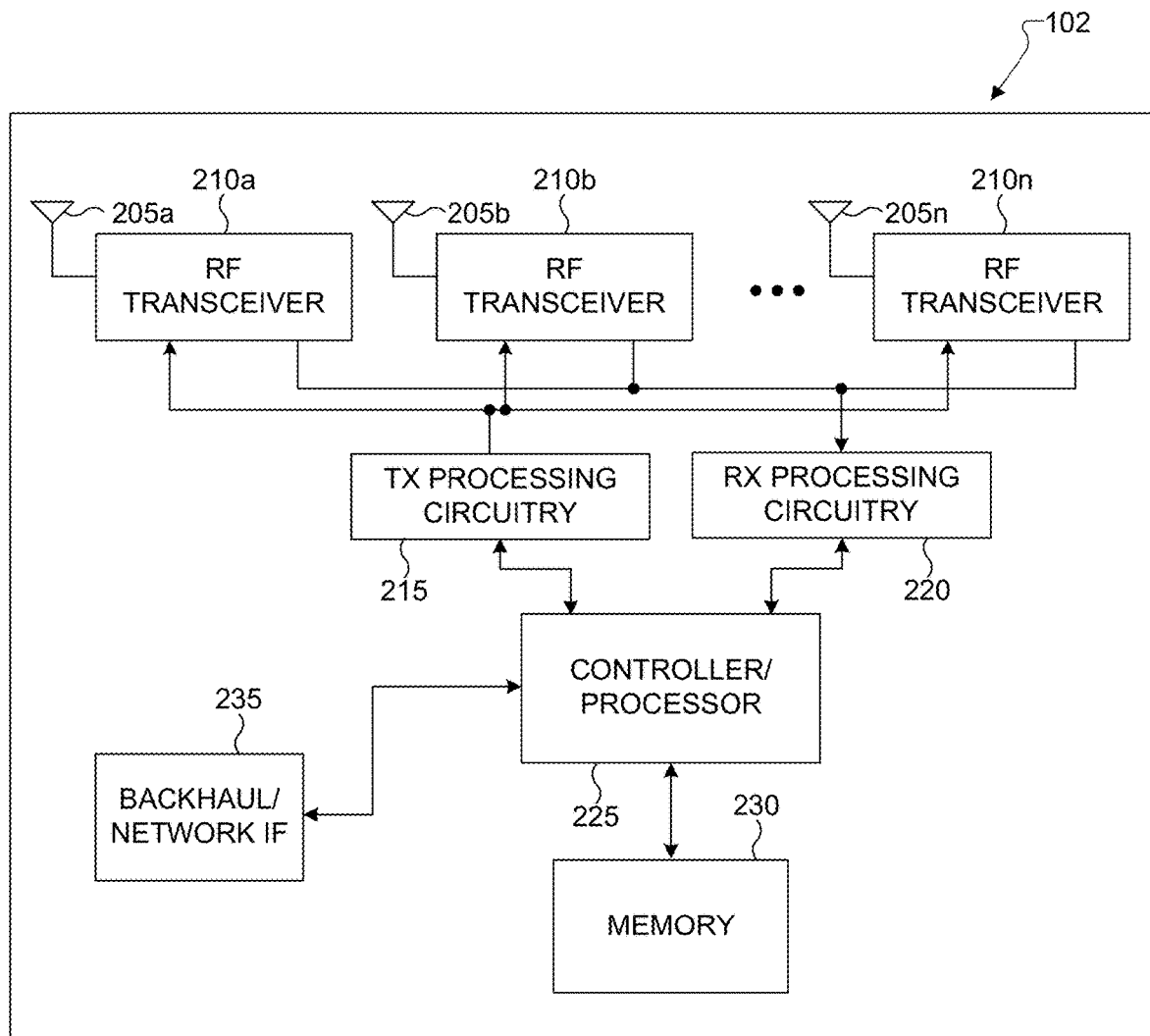
FIG. 2 illustrates an example gNB according to embodiments of the present disclosure.
Figure 3:
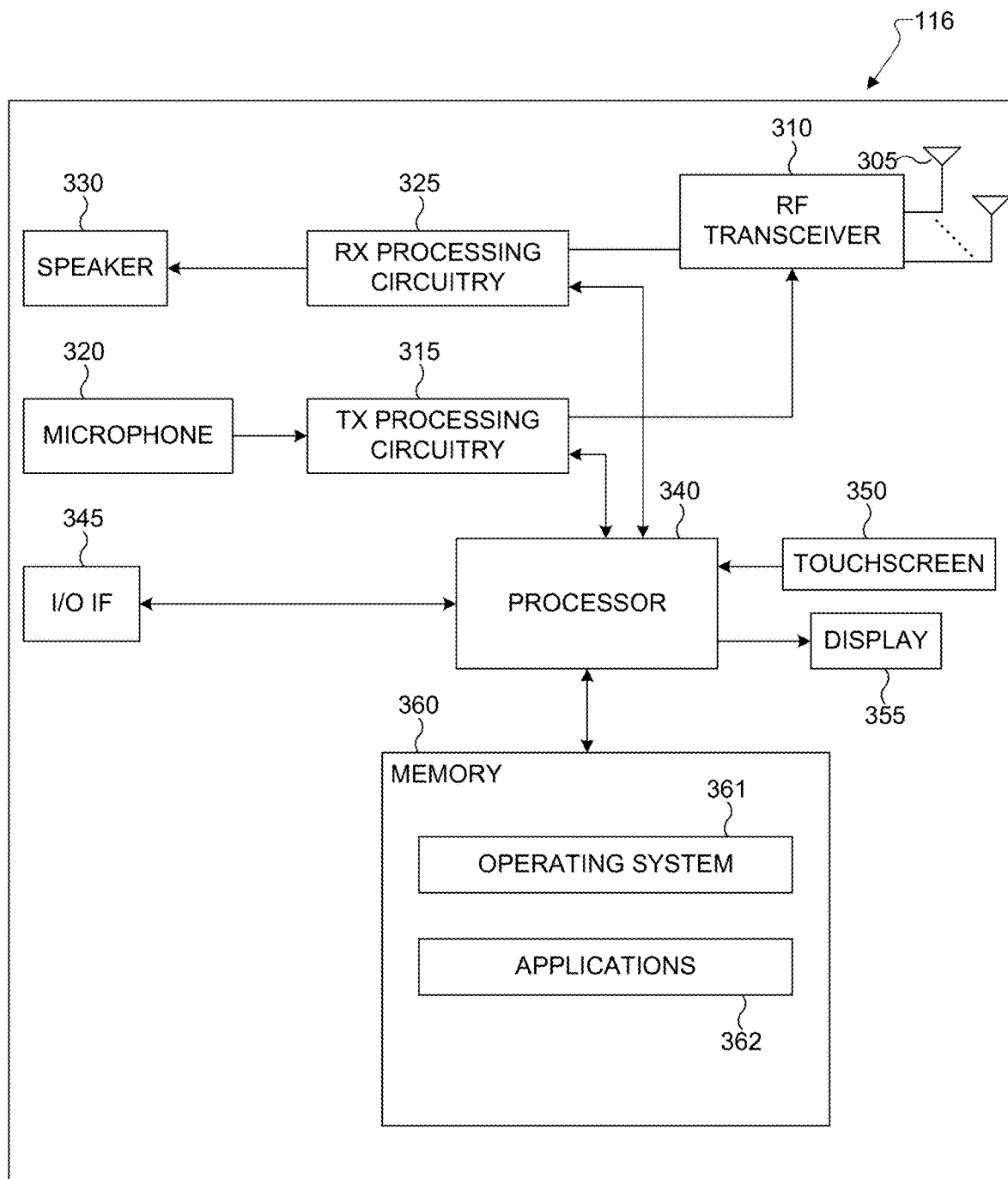
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

Figure 10:
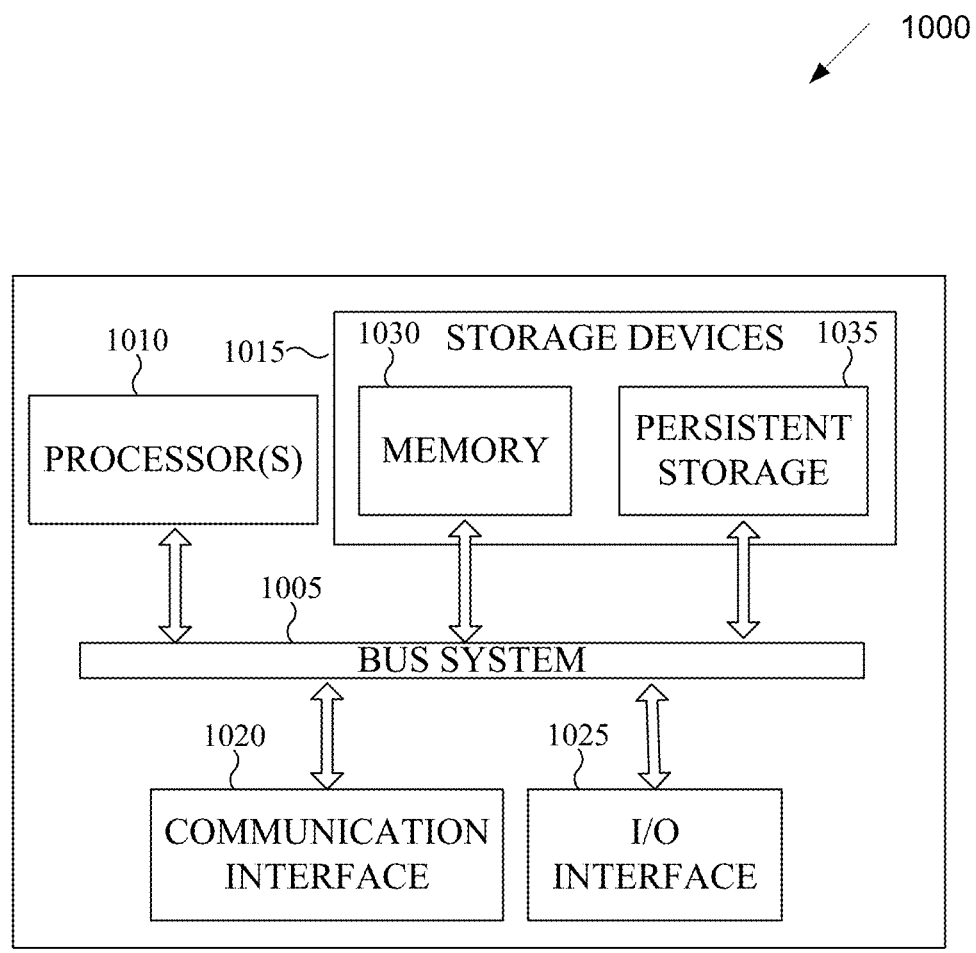
FIG. 10 illustrates an example network entity in the networked computing system according to embodiments of the present disclosure.

As shown in FIG. 1, the wireless network includes a gNB 101 (e.g., base station, BS, a network entity 1000 as illustrated in FIG. 10), a gNB 102 (a network entity 1000 as illustrated in FIG. 10), and a gNB 103 (a network entity 1000 as illustrated in FIG. 10). The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof. In certain embodiments, and one or more of the gNBs 101-103 includes circuitry, programing, or a combination thereof.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Embodiments of the present disclosure recognize and take into account that NTNs have varying delays and necessitate different parameters for operations such as cell selection, network selection, handover, paging, random access, and data transfer for optimal network performance and user experience. Accordingly, various embodiments of the present disclosure provide NTN types and the use of the NTN type to facilitate these operations. The present disclosure provides the type of the non terrestrial network (NTN) for transmission and describes the use of the NTN type to facilitate optimization of various NTN operations through implicit settings of relevant parameters. The implicit parameter determination avoids or minimizes common signaling or dedicated signaling, increasing the overall signaling efficiency. Furthermore, this feature facilitates NTN type-specific innovations in the design and operation of network functions including the UE, the gNB, the access and mobility management function (AMF), and the charging function in the core network.

Different types of NTNs or platform types such as a GEO satellite with a transparent payload, a low earth orbit (LEO) satellite with a regenerative payload (e.g., a split gNB with gNB-distributed unit (DU) on the satellite and the gNB-CU on the ground), and an unmanned aerial system (UAS) with a regenerative payload (e.g., the monolithic gNB on the UAS) have significantly different propagation delays. Hence, the knowledge of the NTN type can be used to implicitly determine relevant parameters to increase the efficiency of operations such as system acquisition, cell selection, network selection, handover, random access, discontinuous reception (DRX), paging, and data transfer.

Non terrestrial networks (NTNs) typically have significantly longer propagation delays compared to terrestrial networks (TNs). Furthermore, different NTNs have widely different propagation delays. For example, one-way propagation delay between the UE and the gNB is about 240 ms in case of a GEO satellite-based NTN with a transparent satellite payload. In contrast, one-way propagation delay between the UE and the gNB is about 2.7 to 15 ms in case of a LEO satellite-based NTN with a regenerative satellite payload.

Hence, operations in different NTNs are affected differently if the same radio parameters are used for different NTNs. The use of same parameters for different types of NTNs would lead to suboptimal performance of various operations such as random access, discontinuous reception, and data transfer. For satisfactory operations, several parameters need to be tuned differently based on the NTN type.

The present disclosure provides an "NTN type" and provides a transmission of the "NTN type" on one or more interfaces or links in an NTN. The NTN type may be defined with different granularities. For example, the NTN type can distinguish among major types of satellites such as GEO, medium earth orbit (MEO), and LEOs as well as a UAS-based aerial network. Examples of a UAS includes an aircraft and a balloon ("blimp").

While the simplest form of the NTN Type may simply differentiate between a TN and an NTN, the NTN type could be quite comprehensive and distinguish among GEO-transparent payload, GEO-regenerative payload (gNB-DU), GEO-regenerative payload (gNB), MEO-transparent payload, MEO-regenerative payload (gNB-DU), MEO-regenerative payload (gNB), LEO-transparent payload, LEO-regenerative payload (gNB-DU), LEO-regenerative payload (gNB), UAS (including high altitude platform system (HAPS))-transparent payload, UAS (including HAPS)-regenerative payload (gNB-DU), and UAS (including HAPS)-regenerative payload (gNB). The NTN type can also differentiate among different types of beams such as Earth-fixed beams, quasi-Earth-fixed beams, and Earth-moving beams. An Earth-fixed beam covers the same geographic area on Earth at all times. A quasi-Earth-fixed beam covers a certain geographic area during a given time period and a different geographic area during another time period. An Earth-moving beam covers different geographic areas from one instant to the next.

The NTN type may be conveyed to devices directly by signaling a certain number of bits. The NTN type may also be conveyed to devices indirectly on the air interface using a scrambling sequence on a physical signal or a physical channel.

The present disclosure also provides how the NTN type can be used to determine various parameters to enhance operations in an NTN. Examples of operations that can benefits from the NTN type include transmission and acquisition of system information, cell selection and network selection, handover, random access, DRX, data transfer, and paging. The transmission of the NTN type also facilitates innovations in the design and operations of network functions (NFs) such as an NTN UE, a gNB, and an AMF.

In one embodiment, an NTN type can be defined and referred to as at least one of the following examples. Note that combination of the approaches, and/or examples associated with the approaches, can be supported.

In one example, an NTN type can be at least one from a non-terrestrial-network (NTN) or a terrestrial-network (TN). For example, a field with respect to the NTN type (e.g., denoted as ntn-Type) taking value of 0 can mean the associated network/system/gNB is a TN, and taking value of 1 can mean the associated network/system/gNB is a NTN. Or "0" and "1" can be interpreted in the other way around. As another example, absence of a field with respect to the NTN type can mean the associated network/system/gNB is a TN, and the presence of a field with respect to the NTN type can mean the associated network/system/gNB is a NTN.

In one example, an NTN type can be at least one from a satellite-based access network or a UAS-based aerial network. For example, a field with respect to the NTN type (e.g., denoted as ntn-Type) taking value of 0 can mean the associated network/system/gNB is an aerial network, and taking value of 1 can mean the associated network/system/gNB is a satellite based NTN. Or "0" and "1" can be interpreted in the other way around.

In one example, an NTN type can be at least one from major types of satellites, such as GEO, MEO, and LEDs, and/or a UAS-based aerial network. For example, a field with respect to the NTN type (e.g., denoted as ntn-Type) taking value of 0 can mean the associated network/system/gNB is an aerial network, taking value of 1 can mean the associated network/system/gNB is a GEO-based NTN, taking value of 2 can mean the associated network/system/gNB is a MEO-based NTN, and taking value of 3 can mean the associated network/system/gNB is a LEO-based NTN. Note the mapping between the value and the meaning in the above is one of examples, and this embodiment also includes any other examples for the mapping between the value and the meaning.

In one example, an NTN type can refer to the type of network/system/gNB as well as the type of payload. A number of bits can be used to represent the target number of NTN types. One example with 4-bit identity, representing twelve types of NTN is shown in TABLE 1.

TABLE 1

Examples of Comprehensive NTN types

| Example NTN type Identity | Example NTN type |
|---|---|
| 0 | GEO- Transparent Payload |
| 1 | GEO- Regenerative Payload (gNB-DU) |
| 2 | GEO- Regenerative Payload (gNB) |
| 3 | MEO- Transparent Payload |
| 4 | MEO- Regenerative Payload (gNB-DU) |
| 5 | MEO- Regenerative Payload (gNB) |
| 6 | LEO- Transparent Payload |
| 7 | LEO- Regenerative Payload (gNB-DU) |
| 8 | LEO- Regenerative Payload (gNB) |
| 9 | UAS (including HAPS)- Transparent Payload |
| 10 | UAS (including HAPS)- Regenerative Payload (gNB-DU) |
| 11 | UAS (including HAPS)- Regenerative Payload (gNB) |
| 12-15 | Reserved- for future use |

In one embodiment, the NTN type can be grouped, such that some parameters can be set associated with the group of NTN types. For example, one group may include all GEOs, and another group may include all LEDs.

In another embodiment, subclasses or subcategories can be defined within a given type of satellite (e.g., within LEDs) based on the earth-satellite distances. For example, one NTN type may correspond to a LEO system with the earth-satellite distance ranging from X km to Y km, while another NTN type may correspond to a LEO system with the earth-satellite distance ranging from Y km to Z km.

In one example, the NTN type can account for the earth-satellite or the earth-UAS distance or the propagation delay, while the payload type (e.g., transparent and regenerative) can be specified separately.

In one example, for the NTN type, subject to approaches and/or examples specified in this disclosure, the NTN type can be defined to be associated with a beam type. For example, an NTN type can be further defined with respect to earth-fixed beams or earth-moving beams, e.g., for non-GEO satellites. For example, a non-GEO satellite such as a LEO or MEO satellite may use a quasi-Earth-fixed beam or an Earth-moving beam.

In one example, subject to approaches and/or examples specified in this disclosure, the NTN type can further include highly elliptical orbiting (HEO) satellites.

Figure 4:
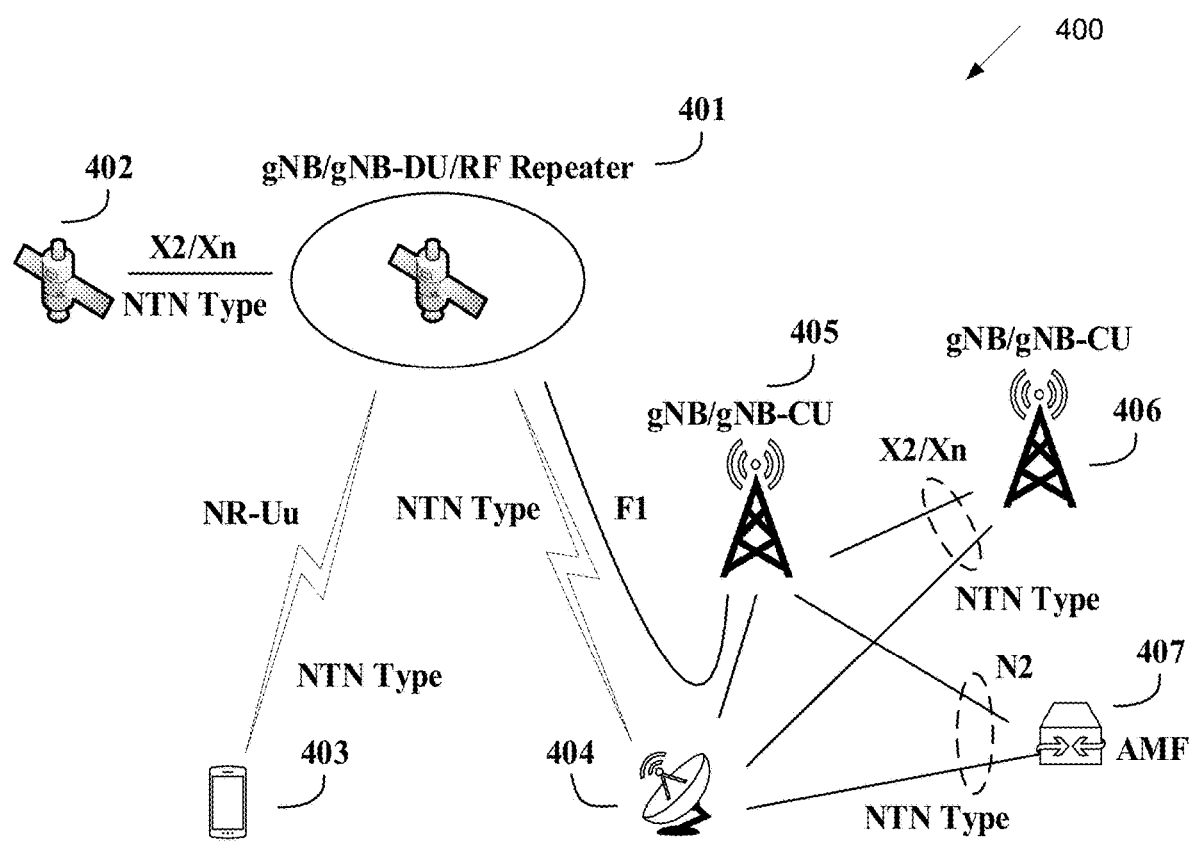
FIG. 4 illustrates an example interface where NTN type is transmitted according to embodiments of the present disclosure.

FIG. 4 illustrates an example interface 400 where NTN type is transmitted according to embodiments of the present disclosure. An embodiment of the interface 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

FIG. 4 shows interfaces where the NTN type can be transmitted to facilitate NTN type-based optimizations of operations.

For one example, the NTN type can be transmitted on NR-Uu interface (e.g., interface between 401 and 403 in FIG. 4). For instance, the NTN type is explicitly indicated as part of system information block 1 (SIB1) over a downlink channel in NR-Uu interface. For another instance, the NTN type can be implicitly acquired by the UE, based on the indication of timing advance value indicated from SIB1 in NR-Uu interface. The NTN type may also be signaled explicitly or implicitly on master information block (MIB), PBCH, or non-SIB1 System Information.

In one example of implicitly conveying NTN type, the scrambling sequence of the PBCH content (which carrier MIB and other information) can be used. In another approach, NTN type can also be conveyed by the demodulation reference signal (DMRS) sequence of PBCH. Other examples of implicitly conveying the NTN type using the physical broadcasting channel (PBCH) content include the initial condition of the DMRS sequence, the sequence mapping order of the DMRS sequence, and a cover code for the DMRS sequence.

In another example, the NTN type can be transmitted on X2/Xn interface (e.g., interface between 401 and 402, or between 405 and 406, or between 404 and 406 as illustrated in FIG. 4).

In yet another example, the NTN type can be transmitted on F1 interface (e.g., interface between 401 and 405 as illustrated in FIG. 4).

In yet another example, the NTN type can be transmitted on the E1 interface between the gNB-CU-CP (Control Plane) and the gNB-CU-UP (User Plane), where gNB-CU-CP and gNB-CU-UP are inside gNB-CU (e.g., blocks 405 and 406 as illustrated in FIG. 4).

In yet another example, the NTN type can be transmitted between a given network function (or, even the NTN platform such as a satellite) and the OAM or another suitable configuration and provisioning server.

In yet another example, the NTN type can be transmitted on N2 interface (e.g., interface between 405 and 407, or between 404 and 407 as illustrated in FIG. 4).

In one embodiment, the knowledge of the type of NTN can be exploited to implicitly determine parameters that influence NTN operations. For example, by transmitting the NTN type, several parameters no longer need to be explicitly signaled. The gNB and the UE can start making use of these parameter settings to make selected operations more efficient. These parameters may belong to any of the radio interface protocol stack layers (i.e., radio resource control (RRC), service data adaptation protocol (SDAP), packet data convergence protocol (PDCP), radio link control (RLC), medium access control (MAC), and physical (PHY)) for air interface operations. Examples of operations that can benefits from the NTN type include transmission and acquisition of system information, cell selection, network selection, handover, random access, DRX, data transfer, and paging.

Figure 5:
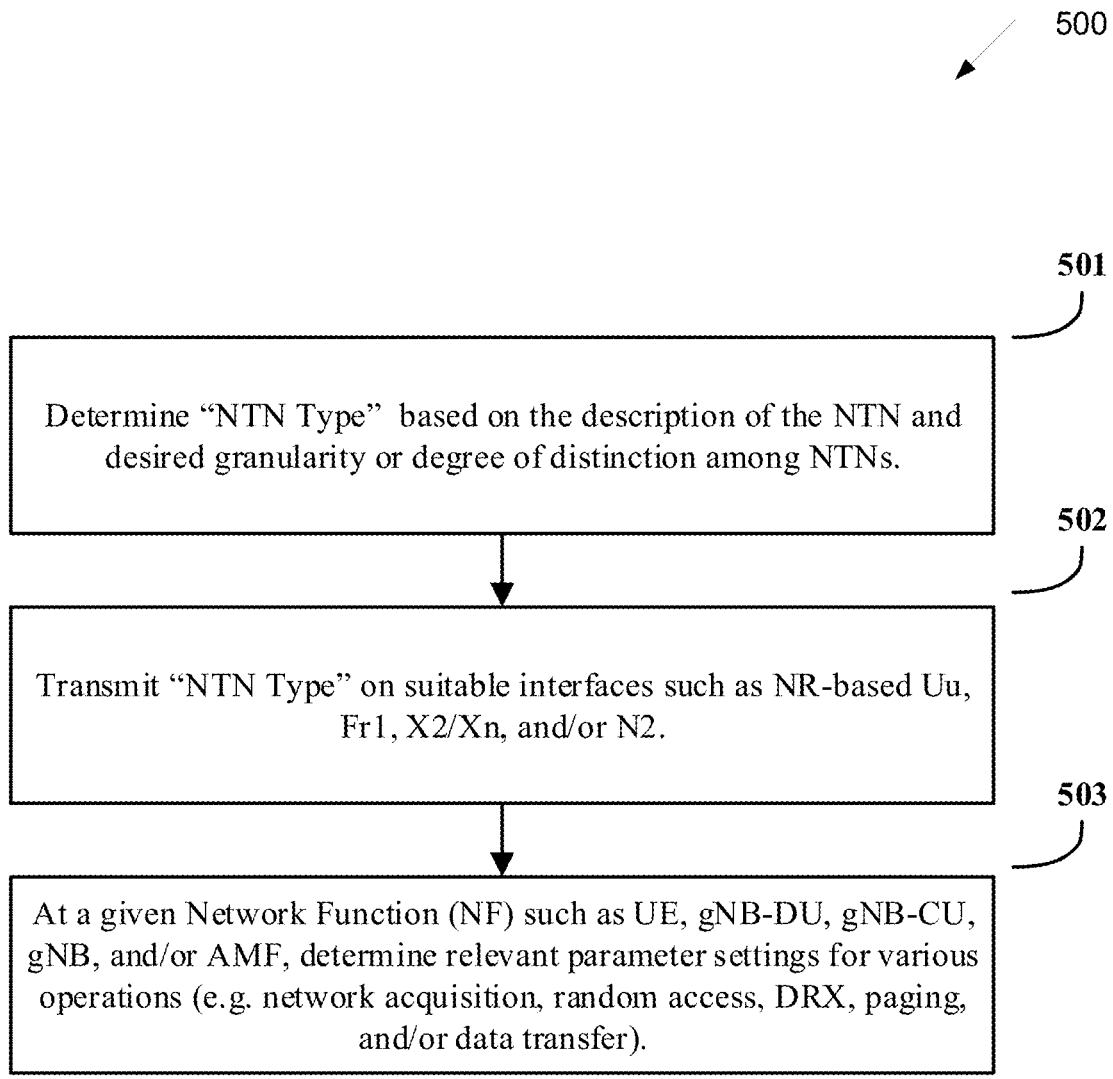
FIG. 5 illustrates a flowchart of a method for NTN type application according to embodiments of the present disclosure.

FIG. 5 illustrates a flowchart of a method 500 for NTN type application according to embodiments of the present disclosure. An embodiment of the method 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

As illustrated in FIG. 5, parameter settings for various operations are described as following approaches in the present disclosure.

An entity in the network (at step 501) decides an NTN type for a given NTN cell as part of network provisioning and configuration and assigns such NTN type to the NTN cell. An example of such entity is operations, administration, and maintenance (OAM). In another embodiment, an NTN platform (e.g., a satellite or UAS) conveys an NTN type of the NTN platform to OAM or another suitable centralized or distributed entity.

In one embodiment, the NTN type is conveyed to a given network entity by an entity such as OAM. In another implementation, network entities exchange suitable messages between them to convey the NTN type. For example, the gNB and the AMF can exchange NG SETUP REQUEST and NG SETUP RESPONSE messages over the N2 interface using NGAP. Additionally, the gNB and the AMF exchange configuration update messages such as RAN/AMF CONFIGURATION UPDATE and RAN/AMF CONFIGURATION UPDATE ACKNOWLEDGE messages. These NGAP messages can convey the NTN type.

In one example, the application of NTN type can be associated with the system Information. The information about the system is conveyed to devices by the network using master information block (MIB), PBCH payload, and/or one or more system information blocks (SIBs) in technologies such as LTE and 5G. Due to widely different distances between the satellite (or UAS) and the NTN UE for different NTN types, MIB and/or SIBs (e.g., SIB1) may be designed and/or transmitted differently for different NTN types for reliable detection.

If the NTN type is specified as part of MIB itself or accompanies the MIB as the physical broadcast channel (PBCH) payload or if the NTN type is transmitted prior to the decoding of the MIB (e.g., using the help of synchronization signals), SIBs such as SIB1 can be designed differently for different NTN types. In case of synchronization signals, new sequences or scrambling of sequences can be used to convey NTN type. Note that SIBs can be processed differently by NTN UEs based on the knowledge of the NTN type. For example, a longer TTI with more repetitions can be used for one NTN type, and a shorter TTI with fewer repetitions can be used for another NTN type. Furthermore, MIBs can be designed differently for different NTN types or different groups of NTN types. There could be blind detection of MIBs with different repetitions for an NTN type compared to TN.

In one example, the application of NTN type can be associated with the RLC parameters. The RLC layer could be configured differently for different NTN types. For example, RLC parameters such as SN-FieldLengthUM, SN-FieldLengthAM, and t-Reassembly can be set differently for different NTN types. The RLC layer supports transparent mode (TM), unacknowledged mode (UM), and acknowledged mode (AM). The RLC protocol data unit (PDU) for unacknowledged mode (UM) and acknowledged mode (AM) includes (i) an RLC header and (ii) RLC service data unit (SDU) carrying an upper layer PDU encapsulating user traffic or a signaling message.

Each RLC PDU includes a sequence number in the RLC header in the RLC acknowledged mode (AM) and may include a sequence number for the unacknowledged mode (UM) in case of RLC SDU segmentation. In 5G release 15, the RLC sequence number is 12 bits or 18 bits long for AM and 6 or 12 bits long for UM. The number of bits in the sequence number, called SN-FieldLengthAM for AM and SN-FieldLengthUM for UM, can be set to one value for one NTN type, and another value for another NTN type.

In particular, when propagation delays between the transmitter and the receiver are long, more RLC PDUs would be in the buffer, requiring identification of such RLC PDUs by a longer sequence number. The parameter, t-Reassembly, can be set per NTN type due to different delays. This parameter is used in RLC AM and RLC UM. This parameter helps detect loss of RLC PDUs at the lower layers, facilitates reassembly of SDU segments, and triggers an ARQ retransmission for the AM. If the knowledge of NTN type is not used, one set of small t-reassembly values (e.g., ms0 and ms5) would be impractical for one NTN type such as LEO and a larger set of small values would be impractical for another NTN type such as GEO.

A much larger set would then be needed with the risk of many unusable values. Another alternative enabled by this feature is to consider the existing T-Reassembly defined in R15 as "incremental times" beyond the NTN-Type-specific parameter (e.g., "minimal_NTN_delay") that represents the minimum round trip propagation delay specific to the NTN type. For example, the final value of T-reassembly used by the NTN UE can be the sum of "minimal_NTN_delay" and R15-defined T-reassembly value. This may allow the reuse of T-Reassembly defined in R15 and make the signaling more efficient and relevant. More specifically, this NTN type-based approach of determining T-reassembly avoids the need to define a much larger set of values to accommodate different types of NTNs (with many values unusable for a given NTN type). This NTN type-based approach also avoids the need to define custom T-reassembly sets for different NTN types. This approach of adding "minimal_NTN_delay" to R-15 defined parameter value can be reused for many time-related parameters covered in this disclosure.

In one example for "minimal_NTN_delay," a numerical value may be implicitly conveyed to an entity through a mapping between the NTN type and associated delays defined in a suitable network function (e.g., gNB or OAM). In another approach, "minimal_NTN_delay" may be explicitly specified on a given interface to reflect a given NTN type.

In another embodiment, to convey the delays on a given interface (e.g., the radio interface), one or more of (i) minimum (which corresponds to minimal_NTN_delay), (ii) typical (or average) and (iii) maximum values for the UE-gNB round-trip (or in a given direction such as the UE-to-gNB or gNB-to-UE) delay may be implicitly specified as a function of the NTN type (e.g., in an NTN type vs. numerical values table). In another approach, these delay(s) may be explicitly specified.

In yet another embodiment, to convey the delays on a given interface (e.g., the radio interface), a scaling factor per NTN type may be defined so that the actual value of the incremental timer adjustments would be (scaling_factor* existing R15-defined timing value). In such case, the overall adjustment made by the UE would be {minimal_NTN_delay+(scaling_factor* existing R15-defined timing value) instead of {minimal_NTN_delay+R15-defined timer value}. In another example, the overall adjustment made by the UE could be {(minimal_NTN_delay+existing R15-defined timing value)*scaling_factor} instead of {minimal_NTN_delay+R15-defined timer value}. The parameter minimal_NTN_delay can be pre-defined in specifications for different NTN Types or may be explicitly broadcast in System Information.

In yet another embodiment, to convey the delays on a given interface (e.g., the radio interface), the NTN type-dependent delays may separately define (i) the delay on the service link and (ii) the delay on the feed link in one approach. In another approach, the processing times for service link-to-feeder link switch and/or feeder link-to-service link switch may also be defined.

In one example, the application of NTN type can be associated with the PDCP parameters. The PDCP layer could be configured differently for different NTN types. For example, two PDCP timers, discardTimer and t-reordering, could be set differently for different NTNs to help achieve similar level of reliability in spite of significantly different propagation delays. This may be quite helpful for delay-tolerant IoT devices that require multiple retransmissions for reliable coverage.

The transmitting PDCP entity discards the PDCP SDU when the discardTimer expires for a PDCP SDU or when a status report from the receiver indicates successful delivery. The timer t-reordering helps detect loss of PDCP Data PDUs. In R15, discardTimer ranges from 10 ms to 1500 ms (or infinity) and t-reordering ranges from 0 ms to 3000 ms. Due to long propagation delays in NTNs, keeping the same maximum values for discardTimer and t-reordering would restrict the number of RLC and hybrid automatic repeat request (HARQ) retransmissions. For delay-tolerant IoT applications, such restriction would limit the achievable reliability.

The NTN type-based settings of discardTimer and t-reordering would alleviate this problem. Similar to the RLC timer approach mentioned above, a better alternative enabled by this feature is to consider the existing discardTimer and t-reordering defined in R15 as "incremental times" beyond the NTN-Type-specific parameter (e.g., "minimal_NTN_delay") that represents the minimum round trip propagation delay specific to the NTN type. This may allow the reuse of discardTimer and t-reordering defined in R15 and make the signaling more efficient and relevant.

In one example, the application of NTN type can be associated with the MAC parameters. Based on the configuration, the MAC layer works with a certain number of HARQ processes and a certain maximum number of HARQ retransmissions. To enable continuous data transfer for a given UE, the number of HARQ processes needs to be increased for an NTN compared to a TN.

For example, according to TR38.821, to enable continuous data transfer for a UE, LEO needs 50, MEO needs 180, and GEO needs 600. As a reference, a TN generally utilizes a maximum of 16 HARQ processes. Due to the need for increased buffering, the maximum number of HARQ processes may be limited. Instead of using a blanket increase of the number of processes and increasing the number of bits to represent the HARQ process ID, NTN type-based number of bits can be used to efficiently signal the HARQ process ID. This may reduce signaling overhead as well as improve reliability of detection. In the physical layer signaling (e.g., signaling on the physical downlink control channel (PDCCH)), every bit is precious. For example, for an NTN type with fewer HARQ processes (e.g., LEO), fewer bits are used to represent the HARQ process ID, and, for an NTN type with more HARQ processes (e.g., GEO), more bits are used to represent the HARQ process ID.

In one example, the application of NTN type can be associated with the PHY parameters. The NTN type can be used to set adaptive modulation and coding (AMC) and uplink power control (PC) parameters. For example, different CQI related parameters (e.g., CQI offsets and CQI granularity) could be selected based on the NTN type. TR38.821 suggests addition of an offset, Koffset, for the uplink transmission (e.g., physical uplink control channel (PUCCH) or physical uplink shared channel (PUSCH) transmission) in response to a scheduling downlink control information (DCI) in slot n in an NTN to account for long delays in an NTN.

For example, after the UE has received a downlink assignment in slot n, the UE needs to send PUSCH at a certain time n+X. X is shorter in a TN but needs to account for longer delays in an NTN. The value of Koffset can be implicitly set differently for different NTN type. In one approach, NTN_Type can set a common delay based on minimum_NTN_delay and another parameter or variable can be added to such delay to provide full flexibility for different NTN types.

In one example, the application of NTN type can be associated with the random access parameters. Based on the NTN type or the group of the NTN type, the start of the random access response search window can be determined. For example, for one NTN type (e.g., LEO or HAPS) the NTN UE can start looking for the random access response (RAR) t1 ms after sending a random access preamble. In contrast, for another NTN type (e.g., GEO), the NTN UE can start looking for the RAR t2 ms after sending a random access preamble. The start of the ra-ResponseWindow can thus be made a function of the NTN type. The UEs can be informed about the explicit start time of the RAR window (i.e., the time difference between the completion of the transmission of the random access (RA) preamble and the earliest time of the RAR transmission by the gNB).

Another random access channel (RACH) parameter that needs a different interpretation for NTN is ra-ContentionResolutionTimer. After sending an RRCSetupRequest (so-called Msg3), the UE starts the timer ra-ContentionResolutionTimer to monitor the PDCCH for Msg4 (e.g., RRCSetup). Such offset can be made a function of the NTN type to facilitate implementation of the offset in UEs to save processing power at the UE.

In one example, the application of NTN type can be associated with the DRX parameters. A UE observes the PDCCH during the ON period of the DRX cycle. The parameter drx-HARQ-RTT-TimerDL specifies the minimum duration before a downlink assignment for HARQ retransmission can occur. Similarly, the parameter drx-HARQ-RTT-TimerUL specifies the minimum duration before an uplink assignment for HARQ retransmission can occur. The values of drx-HARQ-RTT-TimerDL and drx-HARQ-RTT-TimerUL can be defined in the standard per NTN type, and then the NTN UE can simply start making use of these values based on the knowledge of the NTN type. Indeed, a generic Minimum_HARQ_DELAY can be defined per NTN type and actual HARQ delays can be specified relative to such common Minimum_HARQ_DELAY. Alternatively, the "minimal_NTN_delay" approach specified above for RLC parameters can be applied to DRX parameters, too.

The knowledge of the NTN type can be used by the UE during the cell selection/reselection and network selection process, where the UE can prefer a certain cell or a network over another cell or network.

The knowledge of the NTN type can be used by the UE to apply different cell selection or handover criteria or methods.

In one example, the application of NTN type can be associated with the intra-network communications. In case of dual connectivity between two networks such as between two NTNs (e.g., GEO NTN and LEO NTN) and between an NTN and a TN, two base stations exchange signaling messages to set up a link between them. For example, in case of evolved-universal terrestrial radio access-new radio (E-UTRA-NR) dual connectivity (EN-DC), the LTE eNB and the 5G gNB exchange X2AP messages such as EN-DC X2 SETUP REQUEST and EN-DC X2 SETUP RESPONSE. Similarly, prior to NR-NR Dual Connectivity setup or handover, two gNBs communicate with each other to set up a non-UE specific Xn signaling connection between them using XnAP messages such as Xn SETUP REQUEST and Xn SETUP RESPONSE.

In case of a disaggregated or split gNB with gNB-CU and gNB-DU, the gNB-CU and the gNB-DU exchange F1AP messages such as F1 SETUP REQUEST and F1 SETUP RESPONSE to set up the common F1 interface between them. These X2, Xn, or F1 setup messages involve exchange of serving cell information (e.g., carrier frequencies, PCIs, and duplexing type). On the NG or N2 interface between the gNB and the AMF, NGAP messages such as NG SETUP REQUEST and NG SETUP RESPONSE to set up the common N2 interface between them. The NTN type can be added to such setup messages to optimize numerous operations in an implementation-specific manner (e.g., radio resource management including scheduling decisions by the gNB and paging re-tries by the AMF).

In one example, the application of NTN type can be associated with the timing advance. For NTN, there is a need to indicate common timing advance per cell/beam, such that the associated UE in the corresponding cell/beam could only need to take care of the residual timing advance with respect to the common timing advance. If an NTN type is indicated to the UE, e.g., by SIB1, the UE could determine the parameters associated to the timing advance based on the indicated NTN type. For example, denoting the field for indicated timing advance as t_TA, which can be signaled from higher layer (e.g., in SIB1), then the UE can determine the common timing advance as O_TA+t_TA*s_TA, wherein the parameters O_TA (e.g., the offset when calculating the timing advance) and/or s_TA (e.g., the scaling factor when calculating the timing advance) could be determined based on the NTN type.

An example of the dependency of O_TA and/or s_TA based on NTN type is given by TABLE 2, wherein for one sub-example, if NTN type identity 0, 1, 2, and 3 correspond to GEO, MEO, LEO, and UAS, correspondingly, then O_TA0>O_TA1>O_TA2>O_TA3, and/or s_TA0>s_TA1>s_TA2>s_TA3.

TABLE 2

Examples of dependency of parameters for TA based on NTN types.

| NTN type Identity | O_TA | s_TA |
| --- | --- | --- |
| 0 | O_TA0 | s_TA0 |
| 1 | O_TA1 | s_TA1 |
| 2 | O_TA2 | s_TA2 |
| 3 | O_TA3 | s_TA3 |

In one embodiment, the parameter NTN type can be conveyed to at least one of the UE, the gNB, or the AMF according to at least one of the following approaches.

In one example, the parameter NTN type can be conveyed to UEs. The UE can be informed of NTN type through means such as at least one of MIB, the PBCH, or SIB (e.g., SIB1). Both the UE and the network can then use NTN type-specific default parameter settings in the standard.

In one example, the parameter NTN type can be conveyed to at least one of the gNB, gNB-CU, gNB-DU, or the AMF. The OAM can convey the NTN type to the gNB or gNB-CU. The OAM or the gNB-DU/gNB-CU can convey the NTN type to the gNB-CU/gNB-DU. The AMF could be informed about the NTN type by the gNB during the N2 setup.

Figure 6:
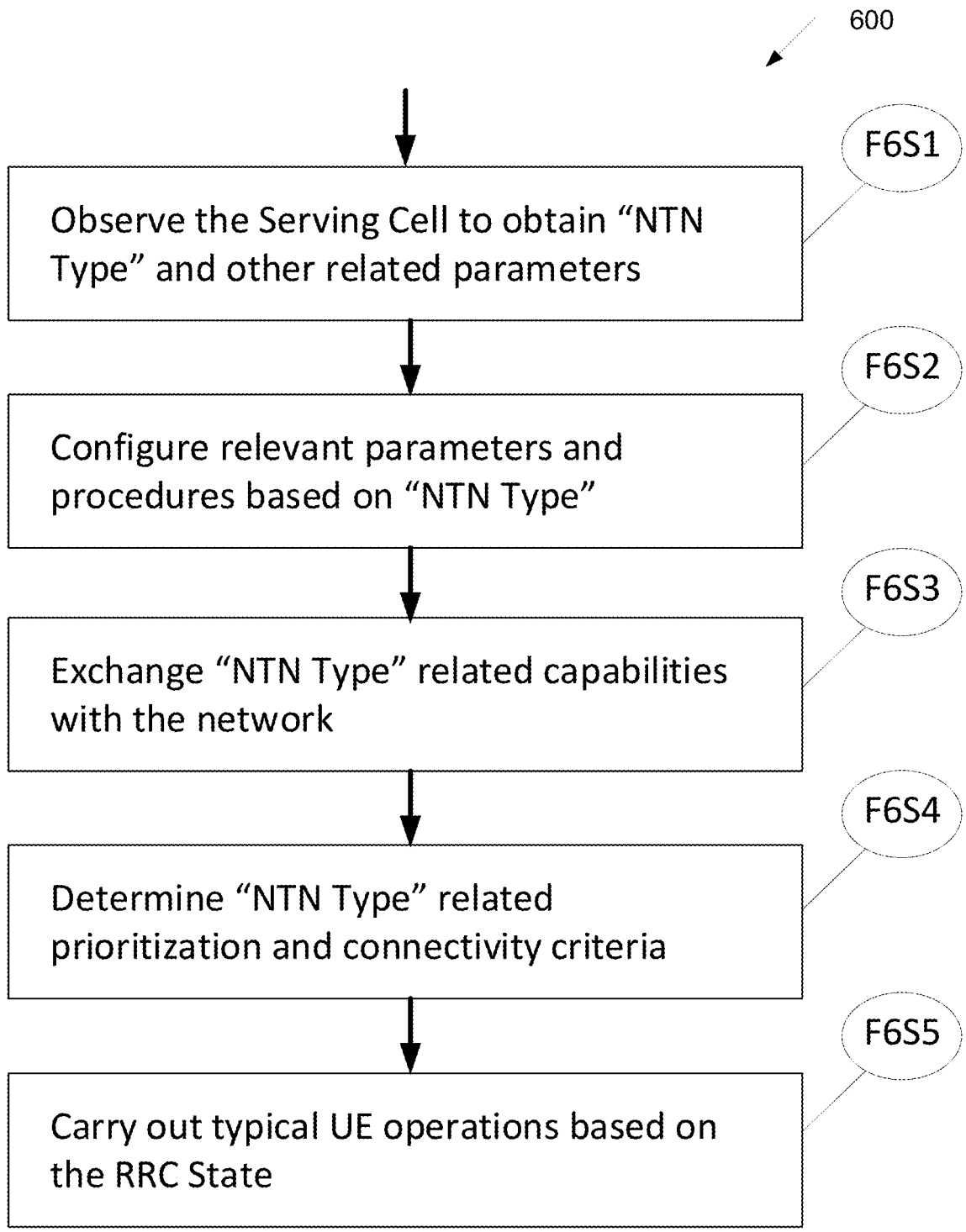
FIG. 6 illustrates a flowchart of a method for a UE according to embodiments of the present disclosure.

FIG. 6 illustrates a flowchart of a method 600 for a UE according to embodiments of the present disclosure. An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

FIG. 6 shows a UE behavior related to "NTN type." As illustrated in FIG. 6, in step F6S1, the UE observes the system information transmitted by the eNB/gNB.

In one embodiment, the UE obtains "NTN type." In another embodiment, the UE obtains information about other NTNs (e.g., information to help detect other NTNs for cell selection and dual connectivity).

The UE, in step F6S2, configures "NTN type"-dependent parameters (e.g., radio protocol stack parameters such as various timers) and procedures (e.g., cell search/selection, network selection, and handover).

In step F6S3, the UE and the network exchange NTN-related capabilities when appropriate (e.g., as part of registration).

In one embodiment, the UE provides the UE's NTN type-based capabilities such as support for global navigation satellite systems (GNSS)/GEO-based NTN or LEO-based NTN and support for dual connectivity across NTNs and across NTN and TN, and/or support for features such as pre-compensation to facilitate time and/or frequency synchronization. In another embodiment, the network asks the UE about the UE's NTN-related capabilities (e.g., based on network's own capabilities and policies).

In step F6S4, the UE determines NTN-related search and connectivity criteria based on the configuration provided by the network in suitable access stratum signaling messages (e.g., RRC reconfiguration/resume) and/or non access stratum signaling messages (e.g., registration accept). Such configuration enables the UE to look for suitable NTN(s) to support reselection to a specific NTN and dual connectivity toward with suitable NTN(s). For example, the network may configure the UE to prefer one NTN type over another NTN type.

The UE in step F6S5 carries out typical operations based on the UE's RRC state (i.e., RRC_IDLE, RRC_INACTIVE, and RRC_CONNECTED) such as cell reselection, registration update, and handover. These operations are influenced by the NTN type-related parameters and procedures.

Figure 7:
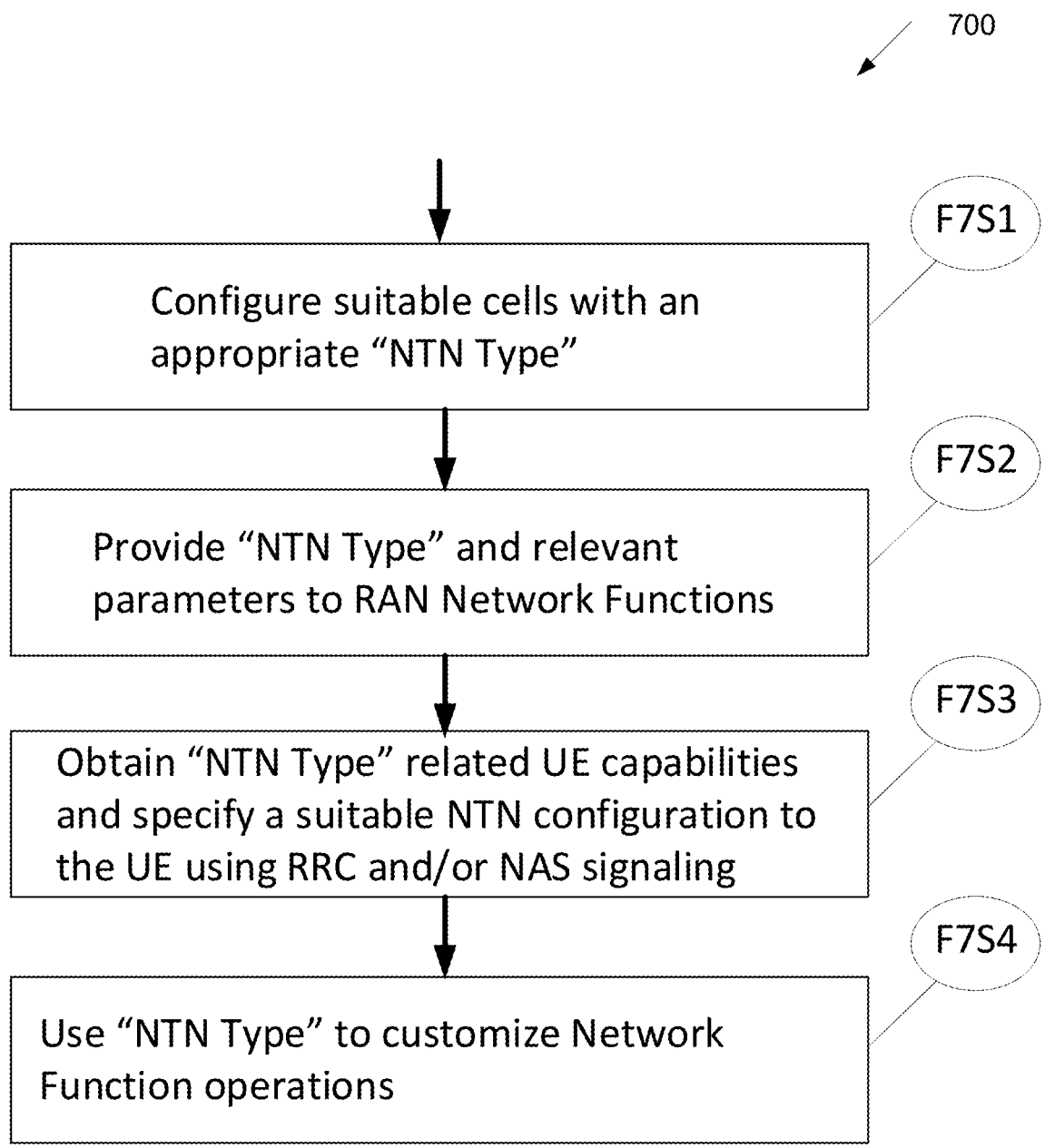
FIG. 7 illustrates a flowchart of a method for a network according to embodiments of the present disclosure.

FIG. 7 illustrates a flowchart of a method 700 for a network according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, in step F7S1, a network entity such as OAM or AS determines a suitable "NTN type" for relevant cells.

The network entity, in step F7S2, provides "NTN type" to suitable radio access network entities including but not limited to an integrated gNB, gNB-CU, gNB-DU, gNB-Radio/RF unit, gNB-baseband unit, and gNB-remote radio unit/remote radio head. In one embodiment, the gNB broadcasts "NTN type" and associated NTN parameters for the serving cell and neighboring cells in the same or different NTN in System Information. The radio network and the core network may exchange NTN type related capabilities using suitable interfaces such as N2.

In step F7S3, the UE and the network exchange NTN-related capabilities when appropriate (e.g., as part of registration). In one embodiment, the network obtains, from the UE, the NTN's NTN type-based capabilities such as support for GNSS/GEO-based NTN or LEO-based NTN and support for dual connectivity across NTNs and across NTN and TN, and/or support for features such as pre-compensation. Certain NTN-related UE capabilities may be obtained by the network outside UE capability exchange procedure such as random access, RRC setup, RRC reconfiguration, and RRC resume.

Such NTN capabilities may be used by one network function (NF) to choose another NF. For example, a gNB may choose an AMF based on NTN capabilities of the AMF (or lack thereof), an AMF may choose an SMF based on the SMF's NTN capabilities, and an SMF may choose a UPF based on the UPF's NTN capabilities. The network may ask or configure a UE about/with NTN-related capabilities based on the network's capabilities and policies and UE and RAN capabilities.

In step F7S4, operations of NFs can be customized to make use of "NTN type" and related parameters and features. For example, charging can be customized based on the usage of an NTN. The UE paging parameters such as a timer can be adapted to the NTN type. The AMF's overload procedure can be controlled using the knowledge of the NTN type so that any signaling differences between a TN and an NTN can be properly reflected in the signaling load calculation at the AMF.

FIG. 7 shows a network behavior related to "NTN type."

The present disclosure provides to optimize NTN operations such as acquisition of system information, cell selection, network selection, handover, random access, DRX, data transfer, and paging.

In one embodiment, the present disclosure provides innovations in UE, gNB, and AMF Implementations. The knowledge of NTN type can be used to optimize operations in an implementation-specific manner, encouraging innovations. For example, the AMF can choose the value of the timer T3513 to minimize paging delay. After sending a paging message to suitable gNBs, the AMF waits for at least T3513 in an implementation-specific manner before re-trying. The UE can save processing power based on the knowledge of NTN type. The gNB can consider NTN type while scheduling UEs and deciding transmission parameters (e.g., modulation and coding scheme combination) and usage of PDCP, RLC, and MAC retransmissions. The specification of the NTN type provides operational flexibility to the UE, the gNB, and the core network because of the NTN type-specific minimum expected propagation and processing delays.

In one embodiment, the present disclosure provides increased signaling efficiency and spectral efficiency. The specification of NTN type allows implicit settings of several parameters, reducing the overall overhead and increasing the spectral efficiency. Through such implicit parameter settings, various operations such as acquisition of system information, random access, DRX, and data transfer can be optimized or made more efficient.

In one embodiment, the present disclosure provides savings in processing power. Unnecessary processing of more overhead bits is avoided, saving the processing power at the transmitter as well as the receiver.

Figure 8:
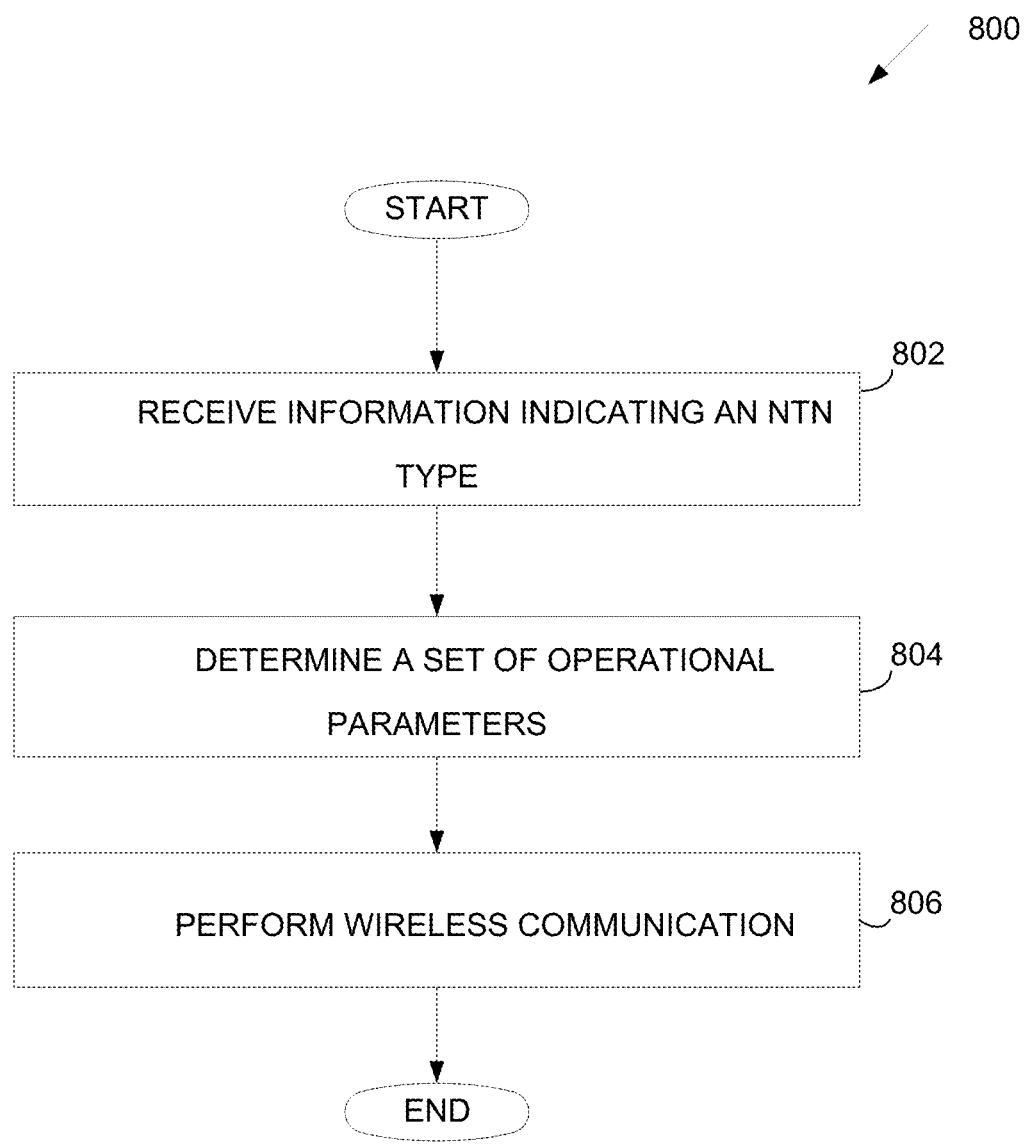
FIG. 8 illustrates a flow chart of a method of UE for NTN type and NTN type based implicit configuration of operational parameters according to embodiments of the present disclosure.

FIG. 8 illustrates a flow chart of a method 800 of UE (e.g., 111-116 as illustrated in FIG. 1) for NTN type and NTN type based implicit configuration of operational parameters according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, the method 800 begins at step 802. In step 802, the UE receives information indicating a non-terrestrial network (NTN) type via a radio interface. In such step 802, the NTN type is associated with at least one of a type of platform or a type of beam of the NTN Next, in step 804, the UE determines a set of operational parameters configured based on the NTN type.

Finally, in step 806, the UE performs wireless communication according to the set of operational parameters. In step 806, the set of operational parameters comprises parameters for a network acquisition, a cell selection operation, a network selection operation, a handover operation, a random access operation, a discontinuous reception (DRX), a data transmission, a paging operation, and a charging operation.

In one embodiment, the UE receives a system information block (SIB) including the information indicating the NTN type and receives the information indicating the NTN type using a non-SIB.

In one embodiment, the UE receives the information indicating the NTN type using one of a scrambling sequence of a physical broadcasting channel (PBCH), demodulation reference signal (DMRS) sequence of the PBCH, a sequence mapping order of the DMRS sequence, or a cover code for the DMRS sequence or receive a common timing advance value to be used for identifying the NTN type, wherein the common timing advance value is commonly used for UEs in a cell.

In one embodiment, the UE receives NTN type-based information to facilitate timing and frequency synchronization and associated pre-compensation by UEs.

In one embodiment, the UE receives a request message to transmit an NTN capability, transmit the NTN capability in response to the request message, the NTN capability indicating the NTN type that is supportable, a dual connectivity between two NTNs, and a dual connectivity between the NTN and a terrestrial network (TN), and receive information to configure a preferred NTN type for the UE.

In such embodiment, the NTN capability of the UE and a cell is used to select a set of network functions (NFs) including an access and mobility management function (AMF), a session management function (SMF), and a user plane function (UPF).

Figure 9:
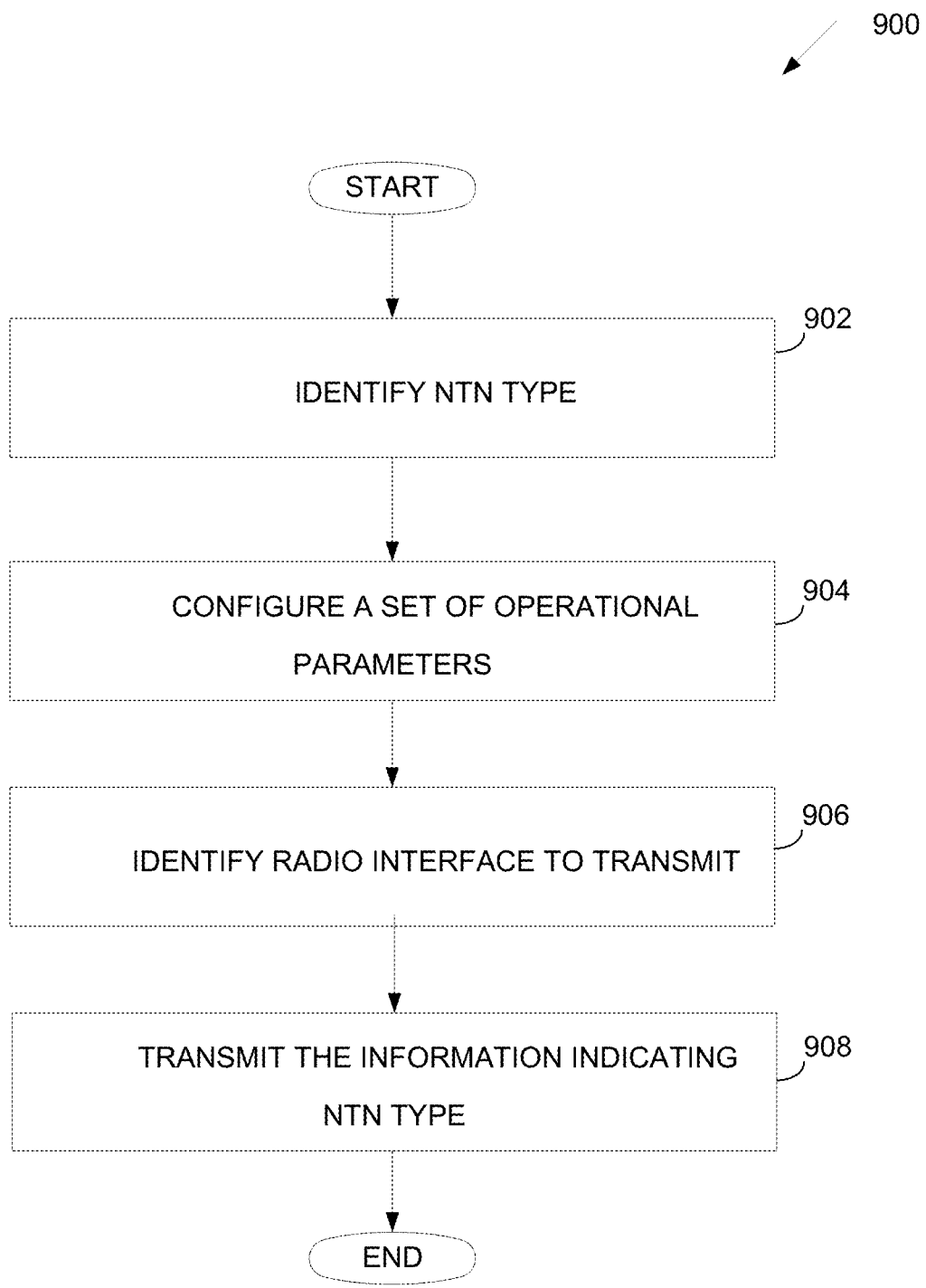
FIG. 9 illustrates a flow chart of a method of network for NTN type and NTN type based implicit configuration of operational parameters according to embodiments of the present disclosure.

FIG. 9 illustrates a flow chart of a method 900 of network entity (e.g., 101-103 as illustrated in FIG. 1) for NTN type and NTN type based implicit configuration of operational parameters according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the method 900 begins at step 902. In step 902, the network entity identifies a non-terrestrial network (NTN) type associated with an NTN. In step 902, the NTN type is associated with at least one of a type of network, a type of platform, or a type of beam of the NTN.

Subsequently, in step 904, the network entity configures a set of operational parameters for performing wireless communication based on the NTN type. In step 904, the set of operational parameters comprises for at least one of a network acquisition, a cell selection operation, a network selection operation, a handover operation, a random access operation, a discontinuous reception (DRX), a data transmission, a paging operation, or a charging operation.

Next, in step 906, the network entity identifies, based on a network configuration associated with the NTN, one or more interfaces to transmit information indicating the NTN type.

Finally, in step 908, the network entity transmits, to a user equipment (UE) or network function (NF), the information indicating the NTN type via the identified one or more interfaces.

In one embodiment, the network entity transmits a system information block (SIB) including the information indicating the NTN type or transmits the information indicating the NTN type using a first signal that does not include the SIB.

In such embodiment, the network entity transmits, using the first signal, the information indicating the NTN type including at least one of a scrambling sequence of a physical broadcasting channel (PBCH), a demodulation reference signal (DMRS) sequence of the PBCH, a sequence mapping order of the DMRS sequence, or a cover code for the DMRS sequence, or transmits, using a second signal that does not include the SIB, a common timing advance value to be used for identifying the NTN type, wherein the common timing advance value is the common value for UEs in a cell. In such embodiment, the first signal is different from the second signal.

In one embodiment, the network entity transmits NTN type-based information to facilitate timing and frequency synchronization and associated pre-compensation by UEs.

In one embodiment, the network entity transmits a request message to obtain an NTN capability; receives the NTN capability in response to the request message, the NTN capability indicating at least one of (i) the NTN type that is supportable, (ii) a dual connectivity between two NTNs, (iii) and a dual connectivity between the NTN and a terrestrial network (TN); and transmits information to configure a preferred NTN type for the UE.

In such embodiment, the NTN capability of the UE and a cell are utilized to facilitate selection of a set of NFs including an access and mobility management function (AMF), a session management function (SMF), and a user plane function (UPF).

In one embodiment, the network entity transmits the information indicating the NTN type to the NF from the set of NFs via a network interface (e.g., a different network function via a network interface); and the NF responsible for charging determines a usage cost associated with the NTN for the UE based on the NTN type and the configured set of NFs for a purpose of charging. In such embodiment, one or more NFs may be configured to use the NTN type and a determination of a usage cost associated with the NTN is facilitated for the UE based on the NTN Type and the set of NFs for a purpose of charging.

FIG. 10 illustrates an example network entity 1000 according to various embodiments of this disclosure. The network entity 1000 includes a bus system 1005, which supports communication between at least one processing device such as the processor 1010, at least one storage device 1015, at least one communications interface 1020, and at least one input/output (I/O) interface 1025.

The processor 1010 executes instructions that may be loaded into a memory 1030. The processor 1010 may include any suitable number(s) and type(s) of processors or other devices in any suitable arrangement. Example types of processor 1010 include microprocessors, microcontrollers, digital signal processors, field programmable gate arrays, application specific integrated circuits, and discreet circuitry.

The memory 1030 and a persistent storage 1035 are examples of storage devices 1015, which represent any structure(s) capable of storing and facilitating retrieval of information (such as data, program code, and/or other suitable information on a temporary or permanent basis). The memory 1030 may represent a random access memory or any other suitable volatile or non-volatile storage device(s). The persistent storage 1035 may contain one or more components or devices supporting longer-term storage of data, such as a ready only memory, a hard drive, a flash memory, or an optical disc.

The communications interface 1020 supports communications with other systems or devices. For example, the communications interface 1020 could include a network interface card or a wireless transceiver facilitating communications over the network 130 as illustrated in FIG. 1. The communications interface 1020 may support communications through any suitable physical or wireless communication link(s).

The I/O interface 1025 allows for input and output of data. For example, the I/O interface 1025 may provide a connection for user input through a keyboard, mouse, keypad, touchscreen, or other suitable input device. The I/O interface 1025 may also send output to a display, printer, or other suitable output device.

As described in more detail below, the network entity 1000 can obtains information associated with the UE 116 of FIGS. 1 and 3. The network entity 1000 then identifies a current context associated with the UE 116 based on the received information. The network entity 1000 can then transmit the identified context of the UE 116 to a BS, such as the BS 102 (a network entity 1000 as illustrated in FIG. 10) of FIGS. 1 and 2. The BS 102 can determine whether to update the mobility management configurations for the UE 116 based on the identified context of the UE 116. Additionally, the BS 102 can update the mobility management configurations for the UE 116 based on the identified context of the UE 116. In various embodiments, for example, the network entity 1000 may be or can be located in a network entity such as a mobility management entity (MME), a core network (CN), or an access and mobility management function (AMF).

As described in more detail below, the BS 102 can set mobility management configurations for a UE, such as the UE 111 of FIG. 1, and may be a network entity. The BS 102 can obtain a current context of the UE 111. The current context of the UE 111 can be obtained from the UE 111, itself, or from another device, such as the network entity 1000 as illustrated in FIG. 10.

In one embodiment, the network entity 1000 as illustrated in FIG. 10 may be implemented in a BS (101 as illustrated in FIG. 1) as a part of system. In another embodiment, the network entity 1000 may be implemented as an individual system.

In certain embodiments, the BS 102 obtains information from the UE and identifies the current context of the UE 111 based on the received information. The information can include, but not limited to, the current location of the UE 111 and a QoS of the UE 111. The BS 102 then uses the contextual information associated with the UE 111 to customize the mobility management configurations previously set for the UE 111. It is noted that the mobility management configurations for the UE 111 may differ from the mobility management configurations for the UE 112 based on differences in the current context associated with the UE 111 as compared to the UE 112. Additionally, the mobility management configurations for the UE 111 may change over a period of time based on changes to the context of the UE 111. For example, as the UE 111 moves within the coverage area 120 of the BS 102, the BS 102 can update (modify or change) the mobility management configurations for the UE 111.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A network entity in a wireless communication system, the network entity comprising:
a processor configured to:
identify a non-terrestrial network (NTN) type associated with an NTN; and
configure a set of parameters for performing wireless communication based on the NTN type; and
a transceiver operably connected to the processor, the transceiver configured to transmit, to a user equipment (UE) or a network function (NF), information indicating the NTN type via one or more interfaces,
wherein the NTN type indicates of a type of an NTN satellite and a type of a payload,
wherein the type of the NTN satellite indicates one of a geostationary earth orbit (GEO), a medium earth orbit (MEO), a low earth orbit (LEO), or a unmanned aerial system (UAS), and
wherein the type of the payload indicates a transparent payload or a regenerative payload.

2. The network entity of claim 1, wherein:
the information indicating the NTN type is included in a system information block (SIB), and
in case that the NF is responsible for charging, a usage cost associated with the NTN satellite is determined based on the NTN type.

3. The network entity of claim 2, wherein the information indicating the NTN type is transmitted based on at least one of a scrambling sequence of a physical broadcast channel (PBCH), a demodulation reference signal (DMRS) sequence of the PBCH, a sequence mapping order of the DMRS sequence, or a cover code for the DMRS sequence.

4. The network entity of claim 1, wherein:
the set of parameters comprises parameters for at least one of a network acquisition, a cell selection operation, a network selection operation, a handover operation, a random access operation, a discontinuous reception (DRX), a data transmission, a paging operation, or a charging operation, and
parameters for the data transmission include a timing offset from downlink control information (DCI), to an uplink transmission scheduled by the DCI, the timing offset configured based on the NTN type.

5. The network entity of claim 4, wherein:
parameters for the DRX include a downlink round trip time (RTT) timer indicating a minimum duration before a downlink assignment for hybrid automatic repeat request (HARQ) retransmission to be occurred and include an uplink RTT timer indicating a minimum duration before an uplink assignment for a HARQ retransmission to be occurred, and
the downlink RTT timer and the uplink RTT timer are configured based on the NTN type.

6. The network entity of claim 1, wherein the transceiver is further configured to:
transmit, to the UE, a request message to obtain an NTN capability of the UE;
receive, from the UE, the NTN capability of the UE in response to the request message, the NTN capability indicating at least one of (i) the NTN type that is supportable, (ii) a dual connectivity between two NTN satellites, or (iii) a dual connectivity between the NTN satellite and a terrestrial network (TN); and
transmit, to the UE, information to configure a preferred NTN type for the UE.

7. The network entity of claim 6, wherein the NTN capability of the UE and a cell are utilized to select a set of NFs including an access and mobility management function (AMF), a session management function (SMF), and a user plane function (UPF).

8. The network entity of claim 1, wherein the set of parameters include channel quality indicator (CQI) related parameters including CQI offsets and CQI granularity.

9. A user equipment (UE) in a wireless communication system, the UE comprising:
a transceiver configured to receive, from a network entity via an interface, information indicating a non-terrestrial network (NTN) type associated with an NTN; and
a processor operably connected to the transceiver, the processor configured to:
determine a set of parameters configured based on the NTN type, and
perform wireless communication according to the set of parameters,
wherein the NTN type indicates a type of an NTN satellite and a type of a payload,
wherein the type of the NTN satellite indicates one of a geostationary earth orbit (GEO), a medium earth orbit (MEO), a low earth orbit (LEO), or a unmanned aerial system (UAS), and
wherein the type of the payload indicates a transparent payload or a regenerative payload.

10. The UE of claim 9, wherein the information indicating the NTN type is included in a system information block (SIB).

11. The UE of claim 10, wherein the information indicating the NTN type is transmitted based on at least one of a scrambling sequence of a physical broadcasting channel (PBCH), a demodulation reference signal (DMRS) sequence of the PBCH, a sequence mapping order of the DMRS sequence, or a cover code for the DMRS sequence.

12. The UE of claim 11, wherein the transceiver is further configured to receive NTN type-based information to facilitate timing and frequency synchronization and associated pre-compensation by UEs.

13. The UE of claim 9, wherein:
the set of parameters comprises parameters for at least one of a network acquisition, a cell selection operations, a network selection operation, a handover operation, a random access operation, a discontinuous reception (DRX), a data transmission, a paging operation, or a charging operation, and
a parameter for the data transmission includes a timing offset from downlink control information (DCI) to an uplink transmission scheduled by the DCI, the timing offset configured based on the NTN type.

14. The UE of claim 9, wherein the transceiver is further configured to:
receive, from a network entity, a request message to transmit an NTN capability of the UE;
transmit, to the network entity, the NTN capability of the UE in response to the request message, the NTN capability indicating at least one of (i) the NTN type that is supportable, (ii) a dual connectivity between two NTN satellites, or (iii) a dual connectivity between the NTN satellite and a terrestrial network (TN); and
receive, from the network entity, information to configure a preferred NTN type for the UE.

15. The UE of claim 14, wherein the NTN capability of the UE and a cell are utilized to select a set of NFs including an access and mobility management function (AMF), a session management function (SMF), and a user plane function (UPF).

16. A method of a network entity in a wireless communication system, the method comprising:
identifying a non-terrestrial network (NTN) type associated with an NTN;
configuring a set of parameters for performing wireless communication based on the NTN type; and
transmitting, to a user equipment (UE) or a network function (NF), information indicating the NTN type via one or more interfaces,
wherein the NTN type indicates a type of an NTN satellite and a type of a payload,
wherein the type of the NTN satellite indicates one of a geostationary earth orbit (GEO), a medium earth orbit (MEO), a low earth orbit (LEO), or a unmanned aerial system (UAS), and
wherein the type of the payload indicates a transparent payload or a regenerative payload.

17. The method of claim 16, wherein:
transmitting, to the UE, the information indicating the NTN type comprises transmitting a system information block (SIB) including the information indicating the NTN type via a new radio (NR) Uu interface; and
in case that the NF is responsible for charging, a usage cost associated with the NTN satellite is determined based on the NTN type.

18. The method of claim 17, wherein the information indicating the NTN type is transmitted based on at least one of a scrambling sequence of a physical broadcasting channel (PBCH), a demodulation reference signal (DMRS) sequence of the PBCH, a sequence mapping order of the DMRS sequence, or a cover code for the DMRS sequence.

19. The method of claim 16, wherein:
the set of parameters comprises parameters for at least one of a network acquisition, a cell selection operation, a network selection operation, a handover operation, a random access operation, a discontinuous reception (DRX), a data transmission, a paging operation, or a charging operation, and
a parameter for the data transmission includes a timing offset from downlink control information (DCI) to an uplink transmission scheduled by the DCI, the timing offset configured based on the NTN type.

* * * * *